United States Patent
Gebelius et al.

(10) Patent No.: US 6,427,568 B1
(45) Date of Patent: *Aug. 6, 2002

(54) METHOD TO PREVENT OR REDUCE FORMATION OF MAGNETISM IN TWO ADJACENTLY LOCATED SAW BLADES ROTATING IN OPPOSED DIRECTIONS, AND A DEVICE FOR UTILIZATION OF THE METHOD

(76) Inventors: Sven Runo Vilhelm Gebelius, deceased, late of Nynäshamn (SE); by Hjordis Florence Maria Gebelius, P.O. Box 81, Nynäshamn (SE), S-149 21

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,540

(22) PCT Filed: Oct. 3, 1996

(86) PCT No.: PCT/SE96/01251
§ 371 (c)(1),
(2), (4) Date: Apr. 13, 1998

(87) PCT Pub. No.: WO97/13609
PCT Pub. Date: Apr. 17, 1997

(30) Foreign Application Priority Data

Oct. 12, 1995 (SE) ............................................... 9503609
Jan. 4, 1996 (SE) ............................................... 9600048
Apr. 2, 1996 (SE) ............................................... 9601310

(51) Int. Cl.$^7$ ................................................. B26D 7/00
(52) U.S. Cl. ................................. 83/13; 83/171; 83/676
(58) Field of Search .......................... 83/171, 663, 676, 83/835, 13

(56) References Cited

U.S. PATENT DOCUMENTS

| | | | | | |
|---|---|---|---|---|---|
| 1,083,645 | A | * | 1/1914 | Wettstein | 83/835 |
| 3,176,455 | A | * | 4/1965 | Buchanan | 83/676 |
| 3,854,364 | A | * | 12/1974 | Sundstrom | 83/676 |
| 3,872,763 | A | * | 3/1975 | Kayahara | 83/767 |
| 4,106,382 | A | | 8/1978 | Salje et al. | |
| 4,821,617 | A | * | 4/1989 | Fjelkner et al. | 83/835 |
| 5,802,947 | A | * | 9/1998 | Ward, Jr. et al. | 83/663 |

FOREIGN PATENT DOCUMENTS

| | | | | |
|---|---|---|---|---|
| DE | 1050987 | | 3/1958 | |
| DE | 1 957 325 | * | 5/1971 | 83/676 |
| DE | 2 824 213 | * | 12/1978 | 83/676 |
| SE | 8702867-6 | | 2/1989 | |
| SE | 1815016 A1 | * | 5/1993 | 83/663 |
| SE | 9403767-8 | | 8/1997 | |
| WO | WO8900474 | | 1/1989 | |

* cited by examiner

Primary Examiner—M. Rachuba
Assistant Examiner—Kim Ngoc Tran
(74) Attorney, Agent, or Firm—Jacobson Holman, PLLC

(57) ABSTRACT

A method and device for preventing or reducing formation of magnetism in two adjacently located saw blades rotating in opposed rotary directions in relation to each other. Each saw blade is arranged having a number of substantially radially extending through grooves having an extension within the area of the rotary center for each saw blade and the surrounding saw teeth area. The grooves are arranged, when rotating, to remove air existing between adjacent planes of the saw blades. The through grooves are arranged having a substantially curved extension, but may also have a substantially linear extension. The grooves are arranged having a chamfer by the edge portions, arranged to increase removal of air from the space between the interacting saw blades.

18 Claims, 6 Drawing Sheets

US 6,427,568 B1

METHOD TO PREVENT OR REDUCE FORMATION OF MAGNETISM IN TWO ADJACENTLY LOCATED SAW BLADES ROTATING IN OPPOSED DIRECTIONS, AND A DEVICE FOR UTILIZATION OF THE METHOD

FIELD OF THE INVENTION

The present invention relates to a method for preventing or reducing formation of magnetism in two adjacently located saw blades rotating in opposed rotary directions in relation to each other, and a device for utilization of the method

BACKGROUND OF THE INVENTION

SE, B, 458 096 discloses a pair of saw blades, comprising two in relation to each other adjacently located saw blades, arranged while rotating in relation to each other opposed rotary directions to take up a saw cut in a workpiece in a common and interacting operation. According to this prior patent publication internal contact between the saw blades is prevented by application of a pneumatic or hydraulic pressure Ad between the saw blades. To accomplish such a pneumatic pressure, it is proposed that each saw blade is arranged with embossed portions from an outer side plane, arranged to form channels open against the rotary direction. Further improvements of such an interacting pair of saw blades are proposed in SE Patent Appln. No. 9403767-8, primarily intended to improve the cut surface of a workpiece and to reduce burr formation, but also this embodiment is based on that the pair of interacting saw blades are maintained separated by application of a pneumatic or hydraulic pressure.

However, practical use of the above mentioned previously known saw blades has resulted in a previously unknown and non-desirable technical effect. The adjacently located and in relation to each other opposed directions rotating saw blades have been magnetized in use, and since adjacent surfaces have a machined plane surface, the saw blades have when used magnetically adhered to each other with such a force, that they hardly not have been separable from each other. The successively increased magnetization during operation has also resulted in a considerable rotary speed reduction, and the sawing operation has been interrupted in certain cases. During the starting operation, a certain "wobbling effect" has been observed for the saw blades, i.e. oscillations which during an initial stage result in a wider saw cut.

SUMMARY OF THE INVENTION

The object of the present invention is to disclose a method for reducing formation of magnetism in a pair of saw blades of the above mentioned type, which during a starting phase also results in that the adjacently located saw blades move in a parallel relationship, without the above mentioned oscillating movements in relation to each other. The invention also relates to a device for utilization of the method.

The method according to the present invention for preventing or reducing formation of magnetism in two adjacently located saw blades rotating in opposed rotary directions in relation to each other is mainly characterized in that each saw blade is arranged having a number of substantially radially extending through grooves having an extension within the area of the rotary centre for each saw blade and the surrounding saw teeth area, arranged when rotating to remove air existing between adjacent planes of the saw blades, and thereby prevent or reduce magnetization of the saw blades.

The device for utilization of the method according to the present invention is mainly characterized in that each saw blade is arranged having a number of substantially radially extending through grooves having an extension within the area of the rotary centre for each saw blade and the surrounding saw teeth area, arranged when rotating to remove air existing between adjacent planes of the saw blades.

BRIEF DESCRIPTION OF THE DRAWINGS

The method according to the present invention and a nonrestricting example of an embodiment for utilization of the method are more fully described below with reference to the accompanying drawings, in which.

DETAILED DESCRIPTION OF THE PREFERRED EMBODIMENTS

The problem with strong magnetization of two adjacently located saw blades rotating in opposed directions may be related to ionization of intermediately located air molecules in association with formation of a magnetic/electrical changing field, and this phenomena also influences the saw blades during an initial start phase, and as a result, the saw blades do not move in a parallel relationship to each other.

In previously known solutions, as mentioned earlier, the saw blades have been regarded as stable in relation to each other, e.g. by arranging air channels in the saw blades, which when rotated supply air to the space between the saw blades, and thus stabilize same during a sawing operation by means of a pneumatic force.

The method according to the present invention is based on an important and in this connection surprising change of previously accepted technology, namely to remove air existing between the saw blades by means of preferably substantially radially extending through penetrating grooves in the area between the central portion of the saw blades and the saw teeth area.

Theoretically, such an action should result in that the saw blades are pressed towards each other, and presumably that same should be further magnetized, e.g. by means of frictional influence.

However, the method according to the present invention results in a surprising effect, on one hand magnetization of the saw blades is avoided (substantially totally), and on the other hand the saw blades receive a stable and parallel motion when commencing rotation in opposed rotary directions. As a further surprising effect, the saw blades will maintain an adjacent, but separated, relationship.

Figure 1:
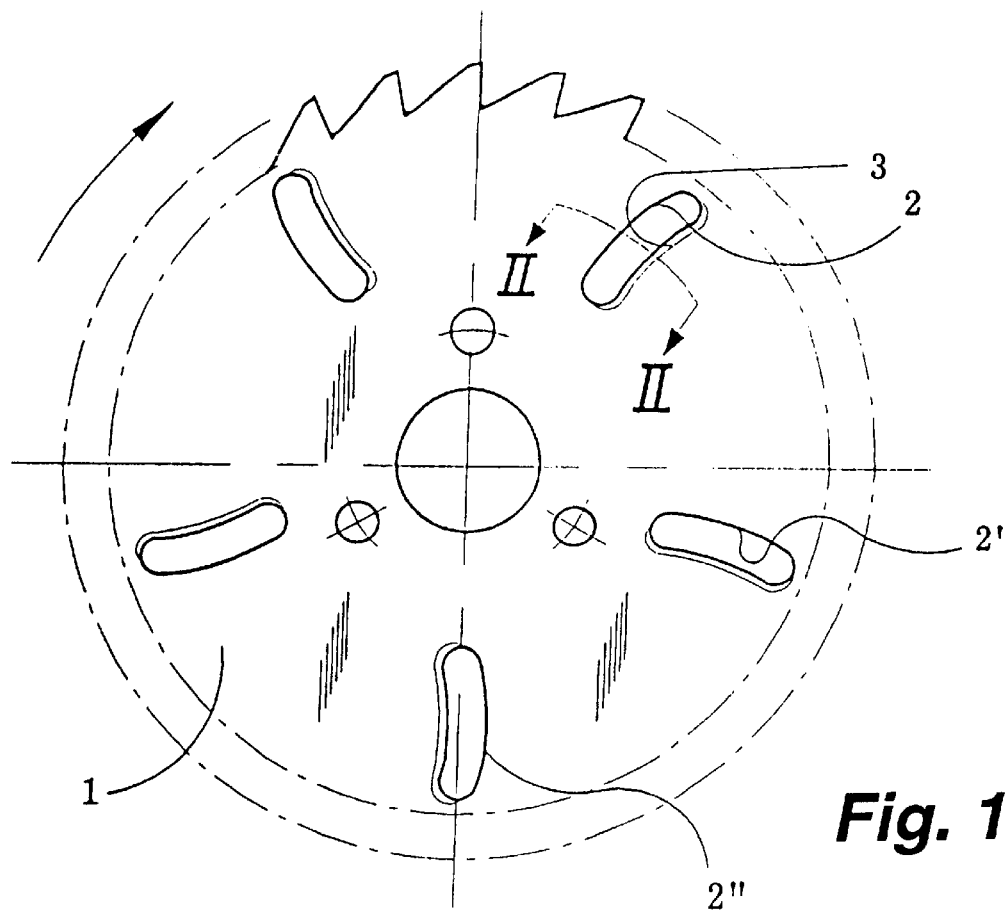
FIG. 1 shows a side view of a saw blade forming a part of an interacting pair of saw blades, viewed from the side which is adjacent to an interacting saw blade and arranged with an example of an embodiment according to the invention.

With reference to FIG. 1, an example of an embodiment for utilization of the method according to the present invention is shown. A saw blade, in its entirety denominated 1, is arranged with a number of substantially radially extending through grooves 2, 2', 21", preferably substantially equally angularly separated from each other. In the shown example of an embodiment the grooves 2, 2', 2" have a slightly bent curved extension, with each end portion located as a first portion in the rotary direction of the saw blade 1, and with the central portion as a successively following part. This configuration is a preferred configuration, but also opposed extension, or a substantially linear extension, can be used.

The effect of these grooves can be further increased, which initially is described with reference to FIG. 2. In order to further disclose which plane that is located adjacent to an interacting saw blade, same has been denomitated "N", whereas the plane which in use acts as an outer or outside plane is denominated "U". A groove 2 is shown in cross-section, disclosing that the grooves 2, 2', 2" have a chamfer 3 at the edge portion which is a first edge portion in the rotary direction, and that the grooves 2, 2', 2" have a chamfer 4 in the same direction at the edge portion serving as a final edge portion in the rotary direction. The latter chamfer 4 extends from the inner side plane and is inclined towards the outer side plane, whereas the first chamfer 3 is terminated by the edge portion of the grooves 2, 2', 2" which is located by the outer plane of the saw blade 1.

These chamfers 3, 4 cause during rotation of the saw blade 1 removal of air existing by the inside plane of the saw blade 1, i.e. the plane which is adjacent to an interacting saw blade 1'.

Figure 3:
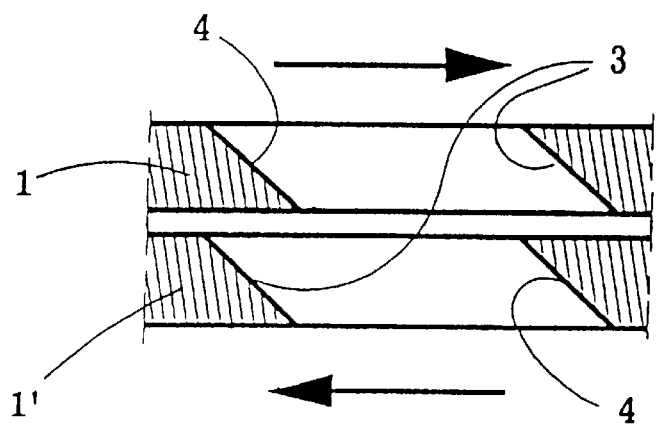
FIG. 3 shows a view corresponding to FIG. 2 disclosing two interacting saw blades rotating in opposed directions in relation to each other.

This is shown more in detail in FIG. 3, which shows a portion of two saw blades 1, 1' rotating in an opposed and adjacent relationship. This figure illustrates how the grooves 2, 2', 2" during rotation of the saw blades 1, 1' remove intermediately existing air, an action resulting in that magnetization of the saw blades 1, 1' is avoided, and that the saw blades 1, 1' receive a stable and parallel movement during the initial stage of a sawing operation. Previously discussed chamfers 3, 4 result in accomplishment of an increased removal of air, but an acceptable reduction of magnetization of the saw blades 1, 1' is also accomplished without such chamfers.

As an example of a preferred embodiment five grooves 2, 2', 2" having a groove width of 3 mm were arranged, and with chamfers 3, 4 arranged having an angle of 45°. A pair of saw blades (diameter 225 mm) arranged accordingly have not resulted in magnetization of the saw blades 1, 1' within the rotary range of 2,000–4,700 rpm.

Tests have also been made without chamfers 3, 4, and at a number of revolutions of 2,000 rpm disclosed that a groove width of at least 4.8 mm for the grooves 2, 2', 2" was required to prevent magnetization. When the number of revolutions was increased to 4,700 rpm a groove width of at least 6 mm was required to avoid magnetization, i.e. an increased groove width is required for an increased rotary speed.

It is also possible to reduce the groove width under 3 mm by changing the angle of the chamfers 3, 4. In this case the chamfers 3, 4 are given a more pointed angle, reduced approximately 3° for each one millimeter reduction of the groove width, i.e. approximately 42° for a groove width of 2 mm, and approximately 39° for a groove width of 1 mm. Chamfers having a more blunt angle than 45° result in a considerably more poor result, and as a result, the width of the grooves 2, 2', 2" can not be reduced as described.

Above described examples of various embodiments disclose that a number of variables exist with regard to the design of the grooves 2, 2', 2", which can be varied to accomplish desired result. Apart from what has been exemplified, the number of grooves obviously constitute a further variable, and the exemplified embodiments include five grooves 2, 2', 2", substantially equally spaced from each other by an angle having the size of 72°. Reduction or increase of the number of grooves 2, 2', 2" can thus be compensated by an increase/reduction of the width of the grooves 2, 2', 2", and the width of the grooves can be further reduced by previously mentioned chamfers. Also utilized rotary speed has a certain influence on the width of the grooves, particularly when the edge portions of the grooves 2, 2', 2" are not arranged with chamfers, resulting, as previously mentioned, in a need for a larger groove width for an increased rotary speed.

Figure 2:
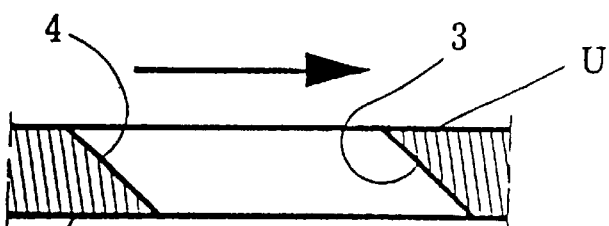
FIG. 2 shows a cross-sectional view in enlarged scale at the line II—II in FIG. 1.
Figure 4:
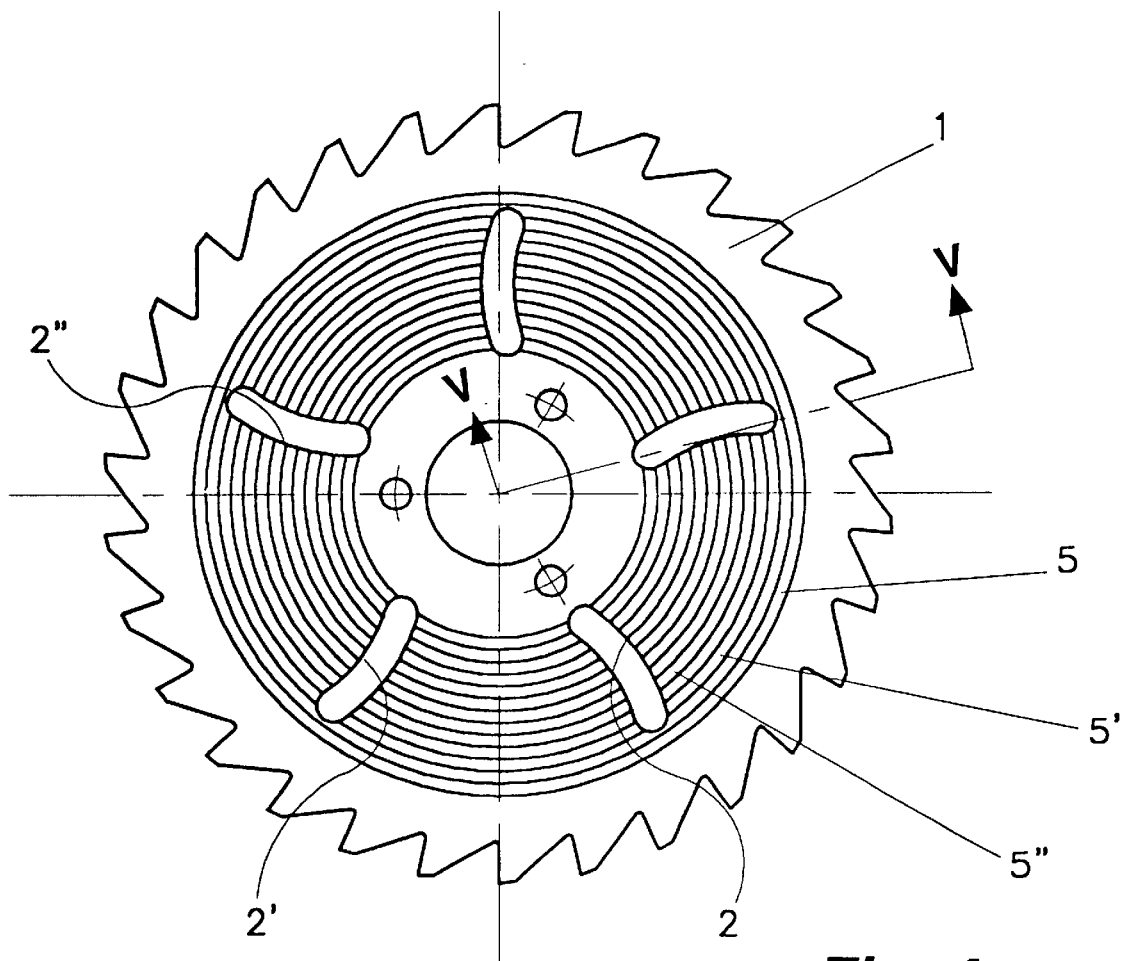
FIG. 4 shows a side view of a modified embodiment of a saw blade according to the present invention, viewed from the side which is adjacent to an interacting saw blade.
Figure 5:
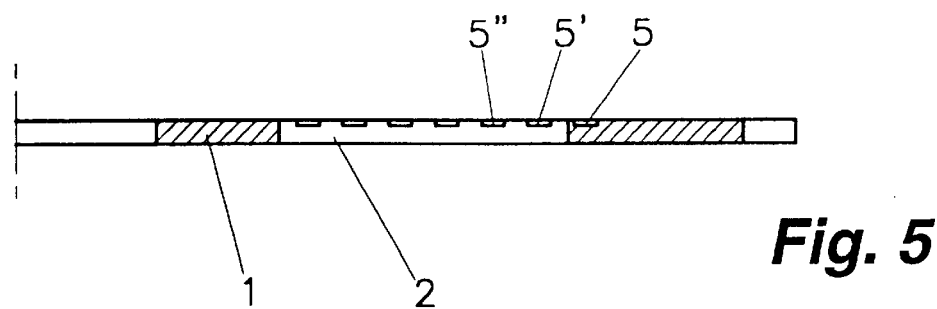
FIG. 5 shows a cross-sectional view in enlarged scale at the line V—V in FIG. 4.

A modified embodiment of a saw blade in relation to FIGS. 1–3 is shown in FIGS. 4 and 5 which in similarity with the previously described embodiment includes a number of substantially radially extending through grooves 2, 2', 2", preferably substantially equally angularly spaced from each other. In the example of an embodiment shown, the grooves 2, 2', 2" have a slightly bent curved extension, with each end portion located as an initial first portion in the rotary direction of the saw blade 1, and with the central portion as a successively following part. This configuration constitutes a preferred configuration, but also a reversed extension, or a substantially linear extension, can be used.

This results in previously discussed advantages and furthermore the vacuum formed between two interacting saw blades is reduced, and also the nondesirable increase of temperature for the saw blades during the rotary movement of same. Said increase of temperature causes a widening of the gap between the outer parts of the saw blades since the saw blades tend to bend away from each other, a condition which results in saw dust and other particles can penetrating in between the interacting saw blades.

The effect of the grooves 2, 2', 2" is increased by a number of non-penetrating grooves or recesses 5, 5', 5", which are arranged by the plane of the saw blade intended to serve as an adjacent surface in relation to an interacting saw blade. According to a preferred embodiment (FIG. 4) the non-penetrating grooves 5, 5', 5'' extend radially from each other with a different radius from the centre of the saw blade 1.

The non-penetrating grooves 5, 5', 5'' have a relatively small depth, e.g. 0.1 mm, but this depth can be varied from a few hundreds of a millimeter to a few tenths of a millimeter, and even deeper grooves 5, 5', 5'' may be used for saw blades having very large diameter. As an example, tests have been performed with extremely good result utilizing a saw blade 1 having a diameter of 230 mm and 7–9 non-penetrating grooves 5, 5', 5'' with a width of 2 mm and a depth of 0.1 mm or less.

However, suitable width/depth for the non-penetrating grooves 5, 5', 5'', space between the grooves and number of grooves, can obviously be varied within broad limits and with regard taken to the diameter of the saw blade, rotary speed and similar factors.

Figure 6:
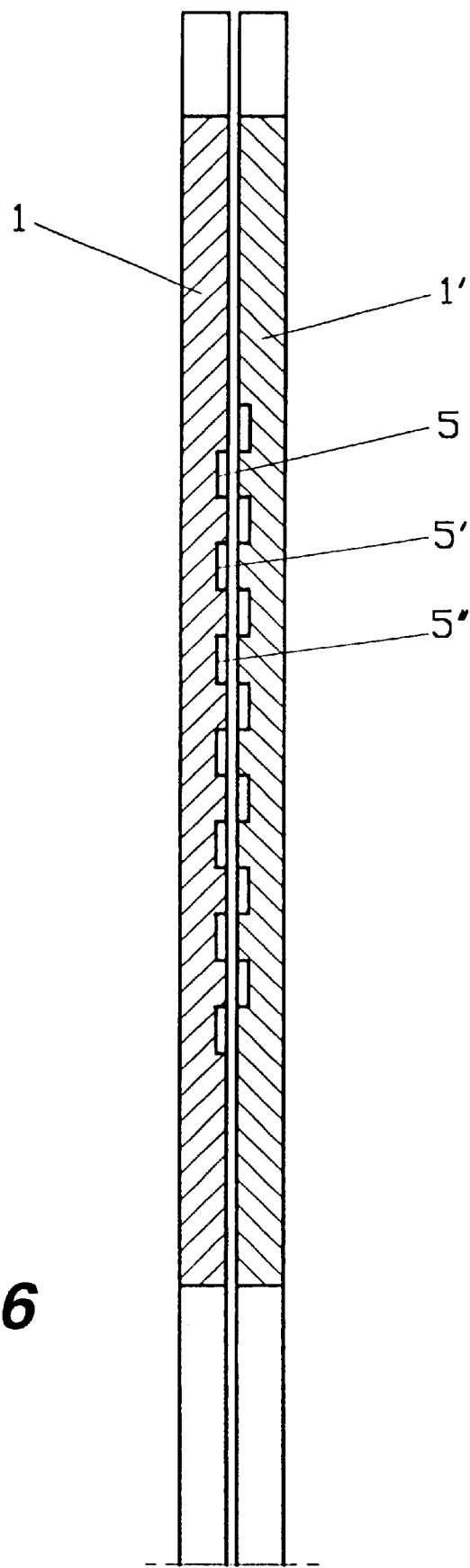
FIG. 6 shows a cross-sectional view in enlarged scale through parts of two interacting saw blades according to the present invention, intended to illustrate an example of how the non-penetrating grooves can be arranged displaced in relation to each other at the two saw blades.

FIG. 6 is intended to disclose how the grooves 5, 5', 5'' can be arranged displaced in relation to each other at two interacting saw blades 1, 1'. Such a relative displacement results in an improved result, but it should be emphasized that the shown degree of displacement can be smaller, and that a fully acceptable result also can be obtained with the grooves 5, 5', 5'' located in a substantially opposed relationship.

In this connection, it should also be emphasized, that even a previous embodiment refers to the non-penetrating grooves 5, 5', 5'' as a number of grooves, said number may also be reduced to only one circular groove. However, an embodiment with only one circular non-penetrating groove has obviously not the same good properties as an embodiment having several such grooves 5, 5', 5'', but even a single groove results in a certain technical effect.

Figure 7:
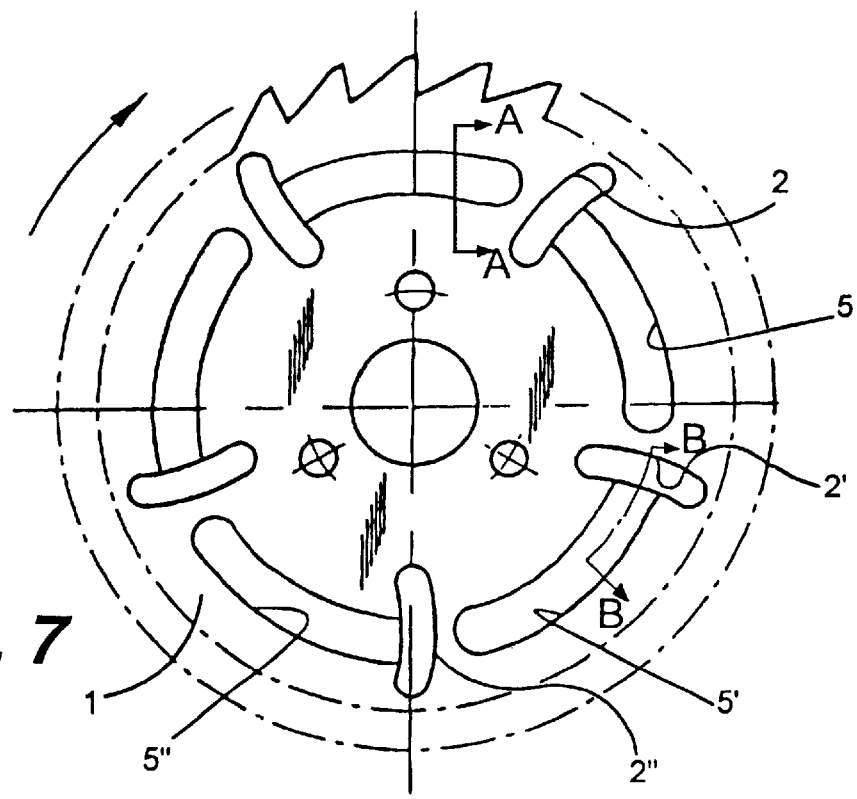
FIG. 7 shows a side view of a further modified embodiment of a saw blade according to the present invention, viewed from the side which is adjacent to an interacting saw blade.
Figure 8:
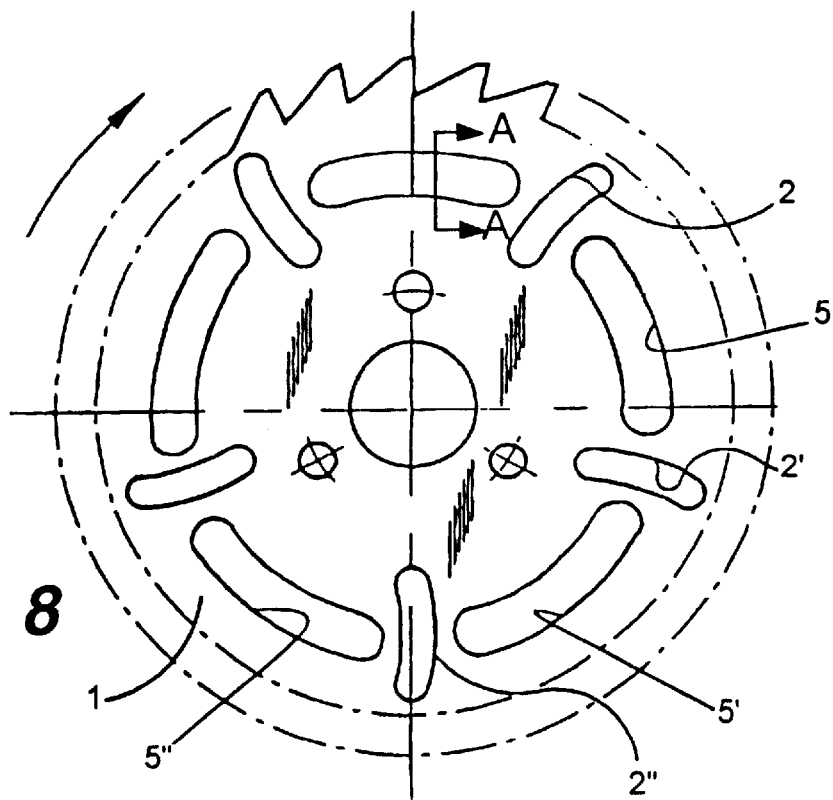
FIG. 8 shows a view corresponding to FIG. 7 of an example of a further modified saw blade according to the present invention.
Figure 9:
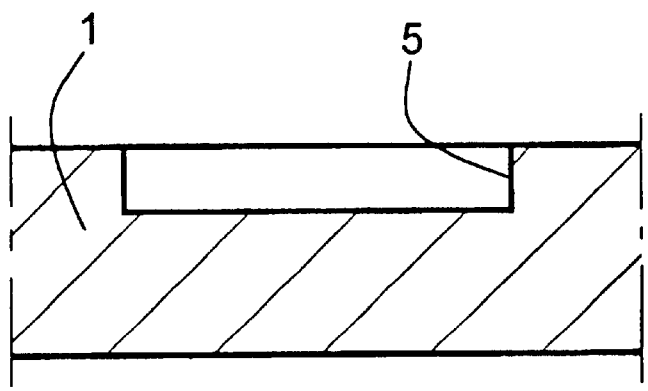
FIG. 9 shows a cross-sectional view in enlarged scale of a saw blade according to the present invention at the line A—A in FIG. 7 or FIG. 8.
Figure 10:
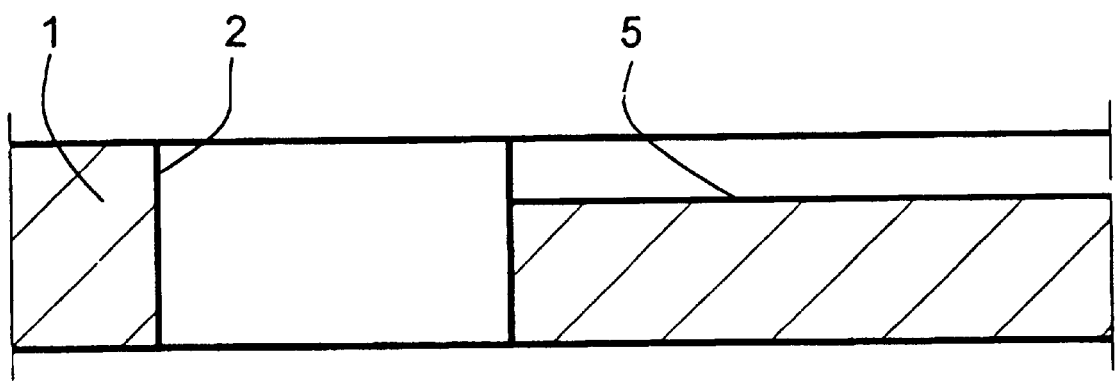
FIG. 10 shows a cross-sectional view in enlarged scale of the saw blade shown in FIG. 7 at the line B—B.

Examples of further modified embodiments are shown in FIGS. 7 and 8, intended to increase the effect of previously discussed through grooves 2, 2', 2'' by a number of non-penetrating grooves or recesses 5, 5', 5'', which are arranged by the plane of the saw blade 1 which is intended to be an adjacent surface in relation to an interacting saw blade. According to a preferred embodiment (FIG. 7), the non-penetrating grooves 5, 5', 5'' extend curved with a common radius from the centre of the saw blade 1 and having an angular extension which is less than the distance between each other adjacently located through grooves 2, 2', 2''. Each non-penetrating groove 5, 5', 5'' extends from a through groove 2, 2', 2'' in the rotary direction of the saw blade 1 (as indicated by an arrow) and is terminated by a closed end portion before the next through groove 2, 2', 2''.

The non-penetrating grooves 5, 5', 5'' have a relatively small depth, e.g. 0.1 mm, but this depth can be varied from a few hundreds of a millimeter to a few tenths of a millimeter, and for saw blades having a very large diameter even deeper grooves 5, 5', 5'' can be used. As an example, extremely good results were obtained with a saw blade 1 having a diameter of 230 mm and non-penetrating grooves with a width of 20 mm and a depth of 0.1 mm. Good results were also obtained when the width of the grooves was reduced to 10 mm.

However, suitable width/depth of the non-penetrating grooves 5, 5', 5'' can obviously be varied within broad limits, related to the diameter of the saw blade 1, rotary speed and similar factors.

Even if the non-penetrating grooves 5, 5', 5'' have a further restricted extension, i.e. when the grooves 5, 5', 5'' do not communicate with the through grooves 2, 2', 2'', an acceptable technical effect is obtained. An example of such an embodiment is shown in FIG. 8, with the non-penetrating grooves 5, 5', 5'' having closed end portions, i.e. not directly communicating with a through groove 2, 2', 2''.

Even though not shown in the drawings, the non-penetrating grooves 5, 5', 5'' shown in FIGS. 7 and 8 may for example be replaced by two or more preferably substantially parallel grooves, i.e. with, in relation to each other, different radius. In such an embodiment the groove width for each individual non-penetrating groove 5, 5', 5'' can obviously also usually be reduced in relation to embodiments having only one groove 5, 5', 5''.

The non-penetrating grooves 5, 5', 5'' can also be used in association with through grooves 2, 2', 2'' having chamfered side portions, i.e. arranged as disclosed in the embodiment according to FIGS. 1–3.

It is also within the scope of the invention to arrange the non-penetrating grooves 5, 5', 5'' in such a way, that the grooves 5, 5', 5'' extend between two adjacently located through grooves 2, 2', 2'', i.e. with each end portion open towards said through grooves 2, 2', 2''. Such an embodiment substantially corresponds to the embodiment previously described with reference to FIGS. 4–6.

Furthermore, the non-penetrating grooves 5, 5', 5'' can also be given another length extension different from what has been shown and described, e.g. a more straight extension, even though the shown curved extension obviously, from a machining point of view and other aspects, is a preferred embodiment.

As previously mentioned, the invention is not restricted to the examples relating to groove depth, groove width and number of grooves given earlier, since the possibility exists to vary these parameters within a large spectrum.

Figure 11:
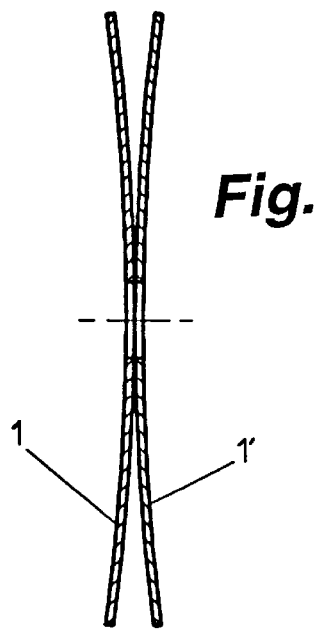
FIG. 11 is a cross-sectional view of two adjacently located saw blades, intended to show exaggeratedly how the saw blades can be deflected away from each other when sawing.

The saw blade 1 according to the present invention can be further modified in order to secure that the outer portion of the saw blade 1 is not deflected away from an adjacent and interacting saw blade 1' during rotation, a situation which is shown exagerrated in FIG. 11.

Figure 12:
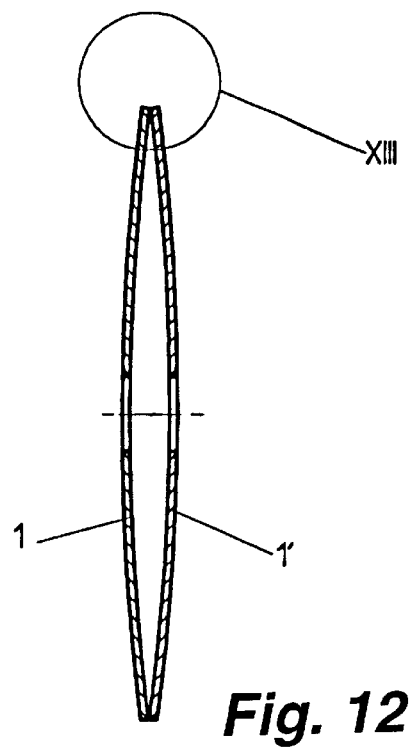
FIG. 12 is a view corresponding to FIG. 11 which shows exaggeratedly a modification intended to remove the problem shown in FIG. 11.

By arranging the saw blades 1, 1' as shown exagerrated in FIG. 12, i.e. shaped with facing surfaces having a substantially concave shape, existing contact surface is reduced considerably, which results in reduced magnetization of the saw blades 1, 1', and also reduced temperature increase. During a sawing operation the saw blades 1, 1' take up a more parallel extension, partly through rotary influence, partly through pressure from the saw cut surfaces formed.

Figure 13:
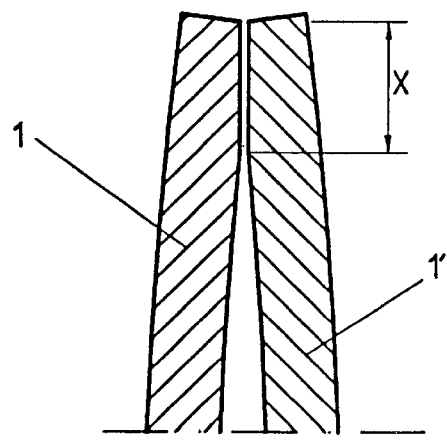
FIG. 13 is a cross-sectional view in enlarged scale of the area denominated XIII in FIG. 11.

Furthermore, the outer peripheral portions of the saw blades 1, 1' are preferably arranged with towards each other facing surfaces initially (prior to a sawing operation) extending in a substantially parallel relationship, as indicated in FIG. 13 as the area "X". This is preferably accomplished by means of a grinding operation, and safeguards that the saw teeth do not intermesh during the rotary movement in opposed directions for the saw blades 1, 1'. As an example of the angular size which is ground off, an angle of 4–7 degrees., but the size of the angle is obviously adapted to the bowl shape of the saw blades 1, 1'.

Figure 14:
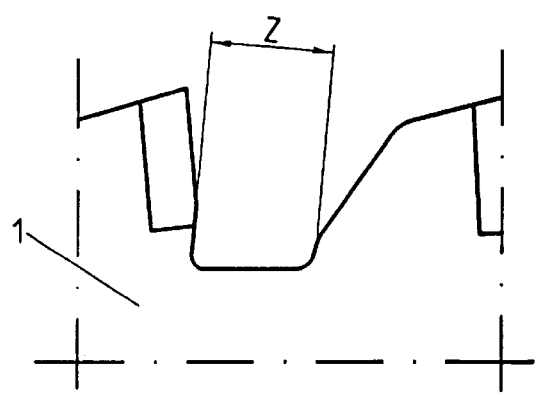
FIG. 14 is a side view showing two adjacently located saw teeth modified according to the present invention.

A further factor has been found influencing the magnetization of the saw blades 1, 1', namely that magnetization is formed in the space for sawdust by the saw teeth. By arranging, as shown in FIG. 14, the bottom part (area "Z") of the space for sawdust substantially straight or slightly curved and with the distance "Z" not smaller than 4 mm, said magnetization can be avoided.

The above modification can easily be implemented when manufacturing new saw blades 1, 1', as well as for existing saw blades 1, 1', in order to further remove the problems obtained through magnetization of the saw blades 1, 1'.

The present invention is obviously in no way restricted to shown and described examples of embodiments, but can be further modified. For example, shown examples of embodiments may in different ways be combined with each other within the scope of the inventive thought and the following claims.

What is claimed is:

1. Method for preventing or reducing formation of magnetism in two adjacently located saw blades rotating in opposed rotary directions in relation to each other, said method comprising:

arranging each of the two adjacently located saw blades with each saw blade having a number of substantially radially extending through grooves located within an area between a rotary centre for each saw blade and a surrounding saw teeth area, and rotating the two adjacently located saw blades in said opposed rotary directions to remove air existing between adjacent planes of the two adjacently located saw blades, and thereby prevent or reduce magnetization of the two adjacently located saw blades.

2. Device for preventing or reducing formation of magnetism, said device comprising:

two adjacently located saw blades rotating in opposed rotary directions in relation to each other, each saw blade having a number of substantially radially extending through grooves located within an area between a rotary centre for each saw blade and a surrounding saw teeth area, said substantially radially extending through grooves being arranged to remove air existing between adjacent planes of the two adjacently located saw blades when rotated in opposed rotary directions.

3. Device according to claim 2, wherein the through grooves have a substantially curved extension having end portions of the through grooves located in a rotary direction ahead of a central portion.

4. Device according to claim 2, wherein the through grooves have a substantially linear extension.

5. Device according to claim 2, wherein a width of the through grooves is larger for saw blades intended for a higher rotary speed range than for saw blades intended for a lower rotary speed range.

6. Device according to claim 2, wherein the through grooves are arranged substantially symmetrically and angularly equally spaced from each other.

7. Device according to claim 2, wherein the through grooves have a first edge portion in the rotary direction forming an inclined edge surface extending from an outer plane of each saw blade towards an area defined by an inner plane located forward in the rotary direction, and the through grooves have a second edge portion at a successively following edge portion to said first edge portion in said rotary direction with a chamfer forming an inclined edge surface extending from the inner plane of each saw blade towards a successively following area of the outer plane in the rotary direction.

8. Device according to claim 7, wherein the chamfers are arranged having an angle of 45°.

9. Device according to claim 7, wherein a width of the through grooves is reduced by forming the chamfers.

10. Device according to claim 2, wherein the through grooves have a substantially perpendicular extension in relation to an outer plane of the saw blade.

11. Device according to claim 2, wherein the through grooves have a larger width for a number of grooves and a smaller width for a number of grooves.

12. Device according to claim 2, wherein at least one non-penetrating groove having a curved extension is arranged at a side of each of the saw blades intended to serve as an adjacent side to the other saw blade.

13. Device according to claim 12, wherein said non-penetrating groove is arranged extending between and communicating with the through grooves.

14. Device according to claim 12, wherein said non-penetrating groove is arranged extending between and with only one end portion communicating with said through groove.

15. Device according to claim 12, wherein said non-penetrating groove is arranged extending between the through grooves, and with such an extension that said non-penetrating groove does not communicate with the through grooves.

16. Device according to claim 2, wherein the saw blades have a substantially bowlshaped extension, facing side planes having a substantially concave extension.

17. Device according to claim 16, wherein the two saw blades are machined at a respective peripheral surface facing each other to form a substantially parallel area.

18. Device according to claim 2, wherein a sawdust space in saw teeth of the saw blades are arranged with a substantially straight or slightly curved bottom area having an extension exceeding 4 mm.

* * * * *